United States Patent [19]

Gallegos et al.

[11] 4,380,191
[45] Apr. 19, 1983

[54] DOUGH FORMING AND COOKING APPARATUS

[76] Inventors: Rafael C. Gallegos, 1018 E. 21st St., Santa Ana, Calif. 92706; Antonio Gallegos, 9411 Brewer Way, Villa Park, Calif. 92667; Robert M. Gallegos, 17961 Darmel Pl., Santa Ana, Calif. 92705; Jess E. Gallegos, deceased, late of Santa Ana, Calif.; by Adeline Gallegos, legal representative, 1707 W. Flora, Santa Ana, Calif. 92704

[21] Appl. No.: 781,434

[22] Filed: Mar. 25, 1977

[51] Int. Cl.$^3$ ............................................. A47J 37/12
[52] U.S. Cl. ........................................ 99/404; 99/407; 99/427
[58] Field of Search ................ 99/404, 353, 386, 405, 99/407, 410, 427, 431, 443 C; 198/455, 459, 461, 579; 425/373

[56] References Cited

U.S. PATENT DOCUMENTS

| | | | |
|---|---|---|---|
| 1,598,435 | 8/1926 | Gottschalk | 99/405 |
| 2,853,937 | 9/1958 | Peck | 99/407 X |
| 3,766,846 | 10/1973 | Jimenez | 99/404 X |
| 3,785,273 | 1/1974 | Stickle | 99/404 |
| 3,946,655 | 3/1976 | Schy | 99/404 |
| 3,948,160 | 4/1976 | Stickle | 99/404 |

*Primary Examiner*—Harvey C. Hornsby
*Assistant Examiner*—Christine A. Peterson
*Attorney, Agent, or Firm*—Edward O. Ansell

[57] ABSTRACT

Apparatus for forming and cooking articles made from material of dough-like consistency. The apparatus combines: means adapted to contain a fluid cooking medium at an elevated temperature; an endless belt means adapted to continuous operation having a plurality of convex porous mold members arranged on a surface; a web-like articulated continuous conveyor means adapted to receive finite quantities of amorphous, dough-like material; and means for intermittently positioning consecutive portions of said web-like conveyor means into operative engagement with consecutive mold members to shape each of said quantities of material of amorphous, dough-like consistency into articles of desired configuration. Thereafter the engaged portions of said conveyor and belt means move into said fluid cooking medium containment means. Guide means are arranged within said fluid cooking medium containment means which direct said operatively engaged article-containing portions of said conveyor and belt means through said fluid cooking medium in a submerged position and thereafter facilitate their separation as they emerge from said fluid cooking medium containment means, with the cooked articles being removed on said conveyor means in an attitudinal orientation promoting optimal drainage and return of the entrained fluid cooking medium to the cooking medium containment means.

15 Claims, 5 Drawing Figures

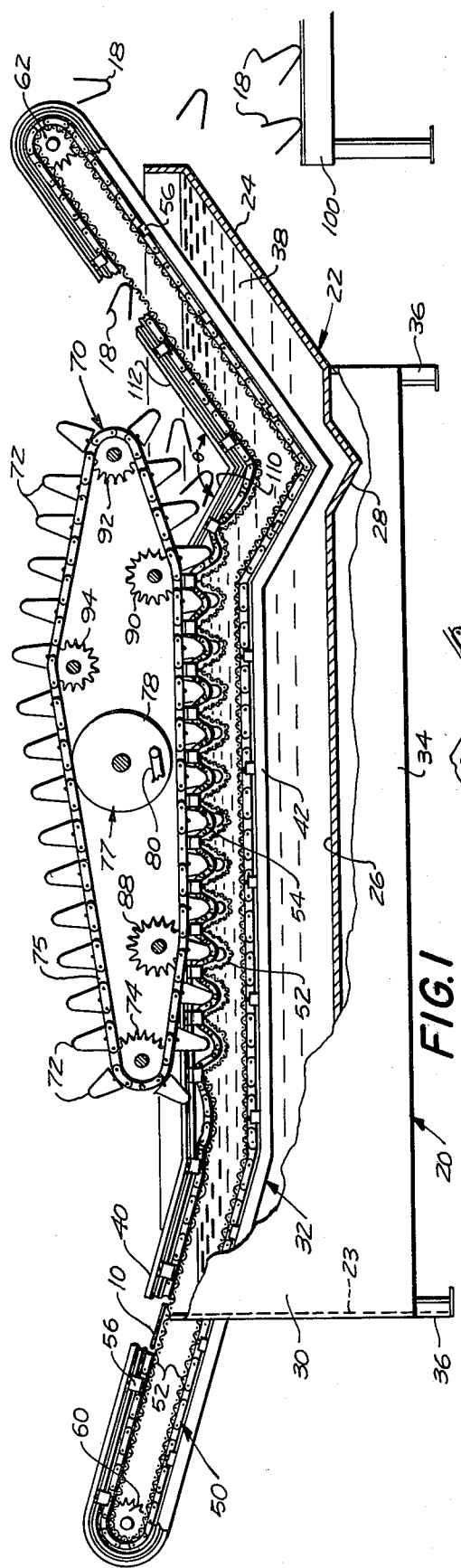
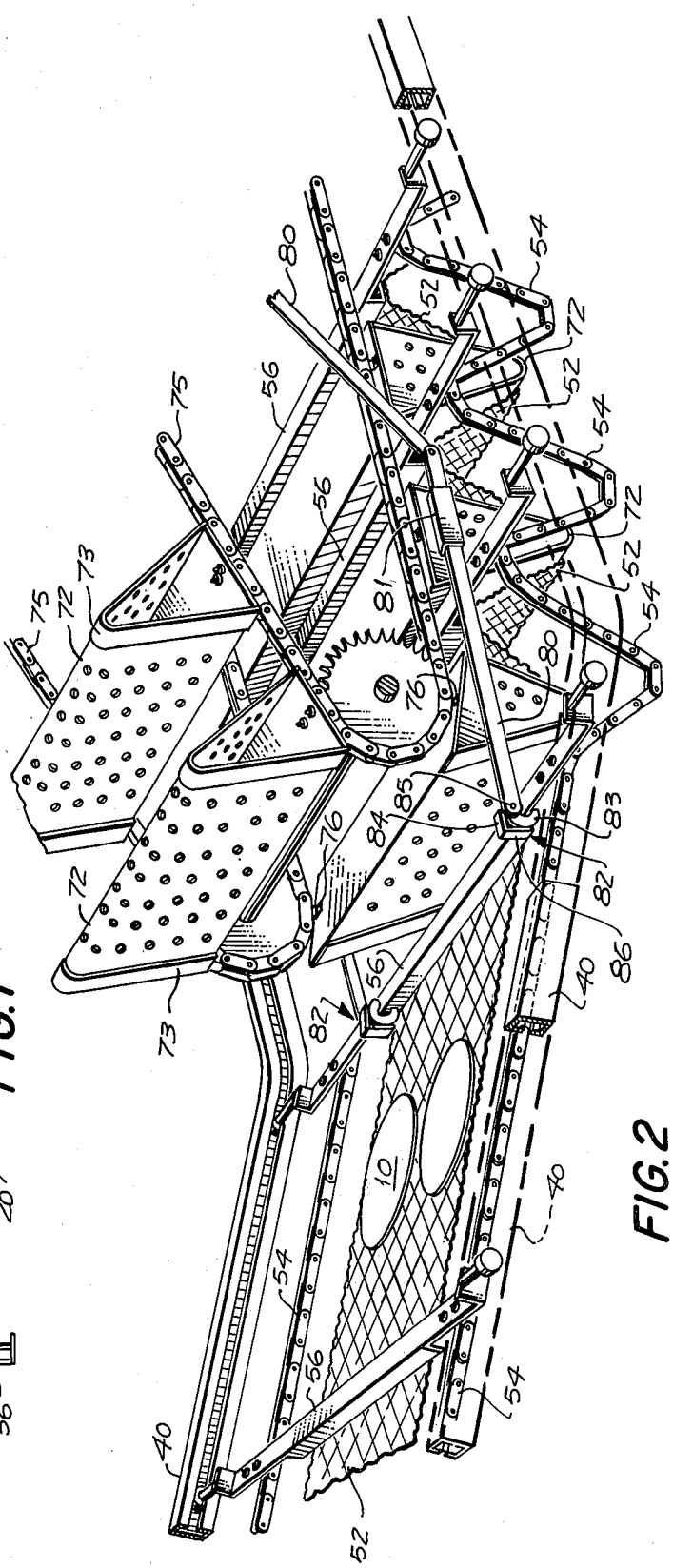

DOUGH FORMING AND COOKING APPARATUS

BACKGROUND OF THE INVENTION

1. Field of the Invention

This invention relates to an apparatus for forming articles from material of dough-like consistency into a desired configuration, transporting the formed articles in a submerged position through a region containing a fluid cooking medium, and removing the articles from the cooking medium in an orientation promoting optimal drainage return of entrained cooking medium from the articles to the fluid cooking medium region.

2. Description of the Prior Art

Forming shaped articles from compression of finite quantities of amorphous material of dough-like consistency and subjecting the pressed article to deep submergence cooking is known. A typical application is with foodstuffs such as the processing of tortilla shells for the production of tacos. Apparatus disclosing such an application are described in U.S. Pat. Nos. 2,603,143 to Saenz; 2,967,474 to Ford; 3,267,836 to Yepis; 3,570,393 to Schy; and 3,785,273 to Stickel. Each of these apparatus has disavantages which are overcome by the present invention in a manner hereinafter described.

SUMMARY OF THE INVENTION

It is the principal object of the present invention to provide an apparatus for forming and cooking articles made from material of dough-like consistency which provides improved simplicity in construction as well as simplicity and safety in operation; is efficient in utilization of fluid cooking medium and heating energy; and which provides cooked articles of high quality on a more consistent basis. The above and other objects of the present invention are achieved by utilization of apparatus comprising: means adapted to contain a fluid cooking medium at an elevated temperature; an endless belt means adapted for continuous operation having a plurality of convex porous mold members arranged on the surface thereof; a web-like, articulated, continuous conveyor means adapted to receive finite quantities of amorphous, dough-like material; and means for intermittently positioning consecutive portions of said web-like conveyor means into operative engagement with the consecutive mold members to shape each of said finite quantities of dough-like material into articles of desired configuration. The engaged portions of the conveyor and belt means thereafter move into said fluid cooking medium containment means. Guide means are arranged within the fluid cooking medium containment means which direct said operatively-engaged, article-containing portions of said conveyor and belt means through said fluid cooking medium in a submerged position and thereafter facilitate their separation as they emerge from said fluid cooking medium containment means. The cooked articles are removed on said conveyor means in an attitudinal orientation promoting optimal drainage and return of entrained fluid cooking medium to the cooking medium containment means.

A feature of the present invention is a reciprocating arm-like member terminating in an improved pawl assembly which successively moves successive portions of the articulated web-like conveyor means, upon which are arranged quantities of the dough-like material, into a position whereby each conveyor means portion is adapted to receive a mold member, thereby sandwiching the dough-like material between the mold and the conveyor to accurately provide the desired article configuration.

Another feature is the provision of rail guide means partially within and partially without the fluid medium containment means including a portion which is upwardly directed, so as to guide the shaped articles through the cooking bath and provide emergence therefrom on the conveyor in a manner ensuring minimal retention in the articles of cooking fluid, as previously described.

An additional feature of the present invention is the re-entry of the conveyor into the cooking bath, after deposit of the cooked articles, traveling through the bath as it returns to the position outside the bath where amorphous quantities of dough-like material are successively placed thereon for subsequent shaping and cooking.

An optional feature is the provision of vibration means proximate the point where the web means disengages the belt means to ensure dislodgment of the cooked article from the associated mold member without damage to the article structure due to imperfections in the mold surface.

While normally the cooked shaped articles are removed by hand from said conveyor means and no article removal means is provided, an optional feature is the provision of such means as a conveyor belt or collection chute at a point which is remote from the point where said web means disengages said conveyor means, to ensure sufficient drainage of entrained fluid cooking medium from and cooling of the article before packaging thereof.

BRIEF DESCRIPTION OF THE DRAWINGS

FIG. 1 is a front elevation of the improved dough forming and cooking apparatus of the present invention.

FIG. 2 is a top perspective view of the loading portion of the apparatus of the present invention and which illustrates the relationship among the endless belt means having a plurality of mold members thereon, the conveyor means adapted to receive quantities of amorphous, dough-like material, and the means for intermittently positioning consecutive portions of the conveyor means into operative engagement with said mold members;

DETAILED DESCRIPTION OF A PREFERRED EMBODIMENT

Figure 5:
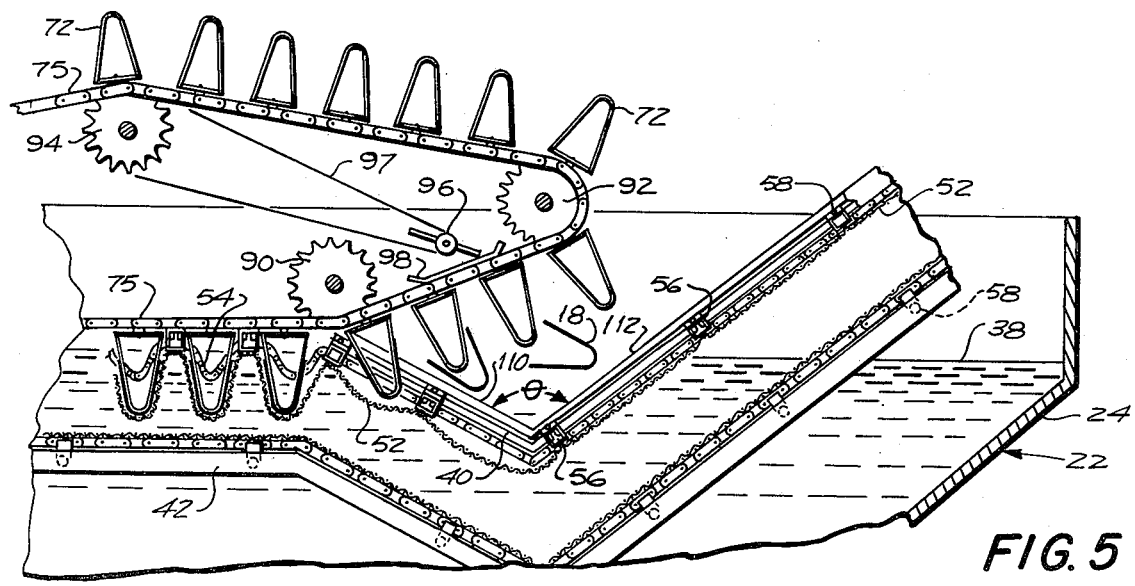
FIG. 5 is a front elevation of the cooked article discharge portion of the apparatus of the present invention.

Referring now to FIGS. 1 and 5 of the drawings, a cooking means 20 for containing a suitable quantity of cooking medium 38 is shown partially broken away to reveal the operative mechanism of the present invention. The cooking means 20 comprises an oil cooking vat 22 mounted on support legs 36, said oil cooking vat 22 having in its bottom 26 a downwardly convergent-upwardly divergent portion 28. The longitudinal sides 30 of the vat are parallel and they join with the lateral sides 23, 24 one of which 24 is downwardly and inwardly inclined to form a drip pan oil return. Guide rails 32 for the conveyor and belt means, to be later described, are arranged at the inner walls of the parallel vat sides 30, both the upper rail portion 40 and the lower rail portion 42 preferably being attached to the inner, fluid-contacting, vat sides 30 lying within the vat and extending partially outside the vat 22. The cooking means 20 is encompassed by an appropriate heat shield 34 and suitable means, not shown but well known in the art, are provided for heating the cooking oil to the desired temperature.

Cooperating with the cooking means 20 to form the present invention are a continuous conveyor means 50, illustrated in FIGS. 1 through 5, and an endless belt means 70 best shown in FIGS. 1, 2, 3 and 5. The continuous conveyor means 50 comprises a web-like articulated chain mesh continuous belt 52 across the width of which are attached a plurality of transverse bar members 56 by clips 59, the bar members 56 being longer than the width of the mesh belt 52. As shown in detail in FIG. 4 the extremities of the transverse bar members 56 terminate in outboard roller means 58 adapted to travel within the guide rails 32. The first and second roller chains 54 are connected with the spaced transverse bar members 56 so as to engage a first roller chain sprocket wheel 60 at the loading portion of the present invention and a second roller chain sprocket wheel 62 at the discharge portion thereof, thereby providing for the continuous conveyor means 50 to move along a path determined by the configuration of the guide rails 32 in a manner hereinafter described.

The function of the plurality of spaced-apart transverse bar members 56 is to secure the two endless and continuous roller chains 54 attached at the ends of each bar member 56; to secure the outboard roller means 58 which run within the guide rails 32; to provide definite spacing along portions of the chain mesh belt 52 for the loading placement of material 10 of dough-like consistency; and to serve as part of a mechanism for intermittently positioning consecutive portions of said web-like conveyor means 50 into operative engagement with the convex porous mold members 72 mounted on said endless belt means 70, in a manner which will also be subsequently described. As will be explained, the chain mesh belt 52 receiving the amorphous dough-like material 10, assists in shaping it into the desired configuration in cooperation with the convex porous mold members 72.

FIGS. 1 through 3 and 5, illustrate that the endless belt means 70 comprises a plurality of convex porous mold members 72 arranged between a plurality of regularly separated spacers 73 which are each connected to a pair of continuous spaced-apart mold drive chains 75 by attachment means 76. The mold members 72 are made of stainless steel or other non-reactive material or the like, and are of the configuration which it is desired the end product to assume because the unprocessed dough 10 will be formed and cooked into the shape of the mold 72. As shown in the drawings, the mold members 72 are perforated to enable ready drainage therefrom of the cooking medium 38, thereby reducing the fat content of the end product 18 and improving the efficiency of the system. The endless belt means 70 is driven by a motor (not shown) which supplies power to belt drive sprocket wheel 74 which engages the mold chains 75, although power could also be supplied to one or more of the first drive sprocket wheel 88, the second drive sprocket wheel 90, the end drive sprocket wheel 92, or the upper drive sprocket wheel 94 as desired. It is noted that the mold drive chains 75 run in an endless path engaging, in sequence, the above-named sprocket wheels 74, 88, 90, 92 and 94.

Figure 3:
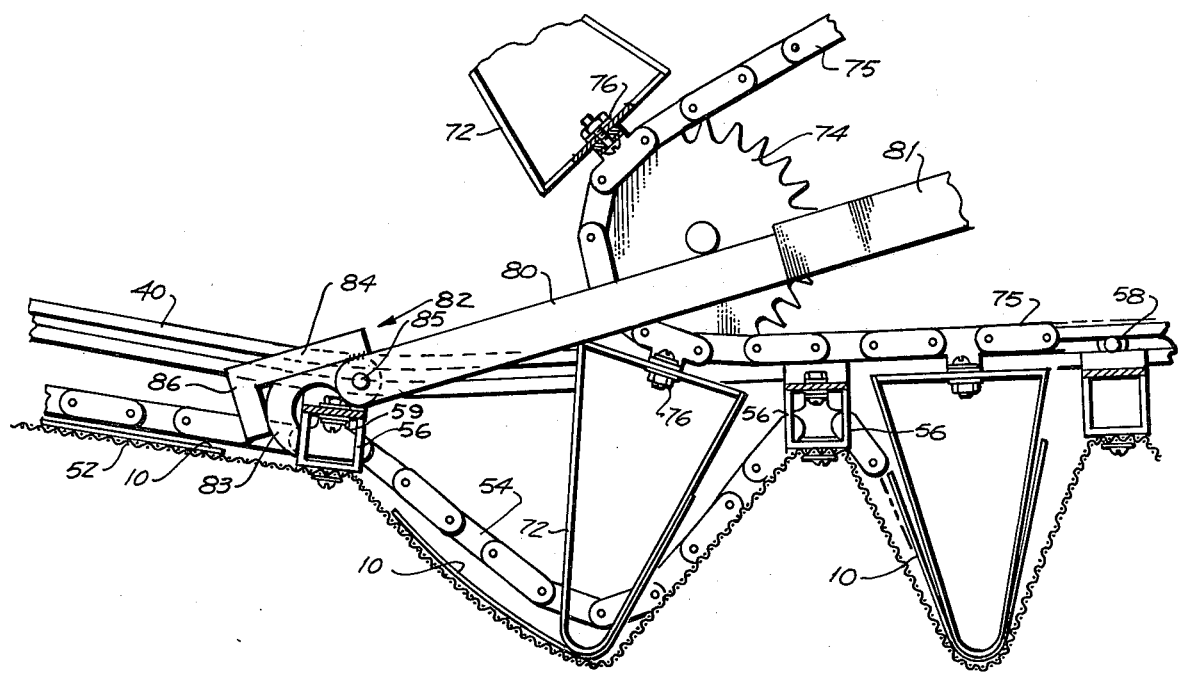
FIG. 3 is a front elevation illustrating the operation of the intermittent positioning means.
Figure 4:
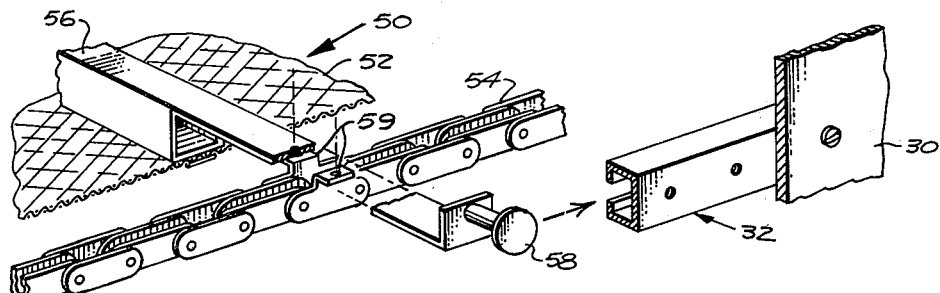
FIG. 4 is a top perspective showing the details of the conveyor means and its relationship to the rail guide means.

Also driven by the motor is a bell crank 77 comprising a drive wheel 78 to which is attached to an articulated reciprocating arm 80 moving through a crank arm guide 81 and terminating in a special pawl member 82 comprising a pivoted hook 83 arranged between a first limit plate 84 and a second limit plate 86 which together serve to confine the pivotal motion of the hook 83. The details of the reciprocating arm 82 are best seen in FIGS. 2 and 3.

To operate the system of the present invention, the uncooked or partially cooked material of dough-like consistency 10, such as, for example, tortillas used to make taco shells, are placed upon the chain mesh belt 52 of the continuous conveyor means 50 between sequential spaced-apart transverse bar members 56 as the continuous conveyor means 50 is made operative. In the arrangement shown in the Figures, actuation of the motor transmits power to one or more of the sprocket wheels 74, 88, 90, 92, 94 which causes the endless belt means 70 to move in a counter clockwise direction, thereby bringing the convex porous mold members 72 into engagement with quantities of the dough-like material 10 arranged to lie on the mesh belt 52. At the same time, the bell crank 77 moves the reciprocating arm 80 through the crank arm guide 81 in reciprocating motion, whereby the pawl member 82 engages with a transverse bar member 56 to pull a portion of the chain mesh belt 52 forward so that it falls under a protruding convex porous mold member 72 to form the concave portion of a mold with the dough 10 impressed between. This sequence is repeated as each convex mold member 72 and an associated portion of chain mesh belt 52 engage with a segment of dough 10 impressed between ride through the heated cooking medium 38 until the mold member 72 disengages from the folded chain mesh belt 52. The chain mesh belt 52 then straightens out to become a conveying means to move the cooked article 18 out of the system for removal by hand or free-fall onto a discharge conveyor 100 at a point which is remote from where the chain mesh belt 52 disengages from the mold members 72 of the belt means 70, for subsequent processing, if any, and packaging.

A special feature of the present invention is the provision of a reciprocating arm 80 which moves within its associated crank arm guide 81 to pull the chain mesh belt 52 in operative engagement with mold member 72. The pawl member 82 engages each transverse bar member 56 by the hook 83 riding, in a right to left direction, across the bar member 56 until it reaches the far side, and then the hook 83 drops downwardly around its pivot 85 to engage the transverse bar member 56. The crank arm 80 then pulls the transverse bar member 56 toward the associated mold member 72, in a left to right direction, bringing with it an associated portion of the chain mesh belt 52. Provision of the first pawl limit plate 84 and second limit plate 86 ensures proper engagement and disengagement of the hook 83, the result of which is that while the endless belt means 70 carrying the convex porous mold members 72 moves in a smooth continuous counter clockwise manner, the continuous conveyor means 50 moves in intermittent motion. Thus the bell crank 77, reciprocating arm 80, pawl member 82, transverse bar 56 combination functions to position the chain mesh belt 52 to receive a corresponding mold member 72 with the tortilla shell 10 arranged therebetween. The continuous conveyor means 50 moves along and into and out of the cooking means 20 as directed by the guide rails 32 by virtue of the motion imparted to the continuous conveyor means 50 through the mold 72-chain mesh belt 52 combination formed as they nest together. Therefore, the bell crank 77, reciprocating arm 80, pawl member 82, transverse bar 56 combination is primarily a positioning means assuring the proper mating of the mold 72 with the dough-carrying segment of the chain mesh belt 52, and is believed to ease the compression on the uncooked shell 10 at the initial contact with the mold 72, because of the slight slackness in the chain mesh belt 52. Provision of such a positioning means is of importance because it ensures that the taco is accurately folded in the middle. Unless this is accomplished, the cooked tortilla may end up in the shape of a "J" hook, that is, an uneven sided article will result. Production of such defectively shaped articles makes a system unduly expensive to operate because such articles cannot be sold through normal channels and must be disposed of as waste, or at salvage prices.

Another feature of the present invention is the provision of the downwardly convergent-upwardly divergent pan portion 28 with a corresponding rail configuration within the tank at the general vicinity where the convex porous mold members 72 separate from the associated portion of chain mesh belt 52. The downwardly converging portion 110 of the rail 40 enhances the separation of the cooked article 18 from the mold 72. The upwardly divering portion 112 of the rail member 40 thereafter becomes elevated and provides an eventual emergence of the cooked taco shells 18 in a manner whereby the entrainment of cooking oil in the cooked article is minimized, because of the gravitational return of cooking medium 38 along the drip pan 24 to the cooking vat 22. Thus, a principal purpose of such a rail configuration, in the case of formation and cooking of tortilla shells for tacos illustrated in the preferred embodiment, is to ensure that the formed and cooked taco shell 18 will emerge from the cooking medium 38 with the blunt edge or keel thereof facing upwardly so that entrained cooking medium 38 will drain out of the taco shell 18 back into the cooking vat 22. While a bottom convergent-divergent portion 28 of the vat 22 is shown in FIG. 1, the provision of such a portion is not necessary so long as the depth of the vat 22 is adequate to accommodate the convergent-divergent excursions 110, 112 of the guide rails 40. However, use of a downwardly distending portion 28 offers the advantage that the vat 22 can otherwise be shallower, thereby requiring having less volume, and requiring less cooking medium 38 than a vat 22 which is deep enough thoughout to accommodate the convergent-divergent excursions 110, 112.

We have found that choice of the proper included angle $\theta$, formed between the downwardly convergent-upwardly divergent sides 110, 112 of the guide rails 40 is of significance as too small, or sharp, an angle will cause the rising mold member 72 to flip the taco shells 18 over in a manner wherein they will ride out of the cooking vat 22 with the keel portion facing downwardly, thereby retaining undesired cooking medium 38 entrained within the shell 18. If this included angle is too large, or shallow, the shell 18 will not properly release from the mold 72 and will ride upwardly with the mold 72, thereafter dropping off in a free-fall with possible damage to the shells 18, or possibly even the apparatus itself if the shells 18 fail to release and are carried along to the next cycle. We are of the opinion that, for proper operation of the system, the included angle $\theta$ should be between 90° and 160°, with the preferable included angle $\theta$ being between 135° and 155°.

Still another feature of the present invention is the provision of means to ensure release of the cooked taco shell 18 from the mold 72. This optional feature may be of benefit when there are imperfections in the convex porous mold members 72 such as rough edges in the punched holes. As shown in FIG. 5, this release means comprises a vibrator 96 driven by a belt 97 running off the upper drive sprocket 94. The vibrator 96 beats against pan member 98, and the resulting vibrations imparted to the mold member 72 ensure that the cooked taco shell 18 falls off the convex mold member 72 onto the conveyor belt 52, in the manner shown in FIG. 5.

What is claimed is:

1. Apparatus for forming and cooking articles made from material of dough-like consistency, comprising:
   (a) means adapted to contain a fluid cooking medium at an elevated temperature;
   (b) an endless belt means adapted to travel at a uniform rate in a continuous path, a portion of which path of travel is through said fluid cooking medium containment means, and a portion of which path of travel is elevated above said fluid cooking medium containment means and in a direction opposite to the direction of the path of travel through said fluid cooking medium containment means;
   (c) a plurality of convex porous mold members arranged on a surface of said belt means;
   (d) separate web-like articulated endless conveyor means adapted to receive finite quantities of amorphous dough-like material;
   (e) means for intermittently positioning consecutive discrete portions of said web-like conveyor means into operative engagement with consecutive mold members arranged on said endless belt means to shape each of said quantities of material of amorphous, dough-like consistency into articles of desired configuration, said engaged portions of said conveyor and belt means thereafter moving into said fluid cooking medium containment means; and
   (f) guide means arranged interiorly and exteriorly of said fluid cooking medium containment means and adapted to direct the transportation of said operatively engaged article-containing portions of said conveyor and belt means through said fluid cooking medium containment means in a submerged position and to thereafter facilitate their separation as they emerge from said fluid cooking medium containment means, said articles being removed on said conveyor means in an attitudinal orientation promoting optimal drainage and return of entrained fluid cooking medium to the cooking medium containment means.

2. An apparatus as set forth in claim 1 wherein said web-like conveyor means comprises an endless belt of chain mesh, a continuous chain member attached to and contiguous with each of the two lateral edges of said chain mesh belt, and a plurality of bar members arranted transversely across said chain mesh belt to form a plurality of junctions between parallel portions of said two chain members through said bar members, thereby defining material-loading areas upon said conveyor means.

3. Apparatus as recited in claim 2 wherein said means for intermittently positioning consecutive portions of said conveyor means comprises a reciprocating crank arm driven in synchronism with endless belt means, and means arranged at the extremity of said crank arm to engage a different and consecutive one of said bar members upon each reciprocation of said crank arm and thereby arrange an associated portion of said chain mesh belt containing a quantity of amorphous, dough-like material into operative engagement with an associated mold member to form an article of the desired configuration.

4. Apparatus as set forth in claim 3 wherein said bar engagement means comprises a pawl member arranged for limited pivotal rotation between first and second limit plates arranged perpendicular to each other.

5. Apparatus as set forth in claim 2 wherein said guide means comprise a continuous parallel rail member arranged on opposite lateral sides of said apparatus, a portion of each rail member being arranged within the fluid cooking medium containment means, and the remainder of each rail member being arranged exteriorly of said containment means.

6. Apparatus as set forth in claim 5, and in addition, roller means arranged at the extremities of each of said chain mesh belt bar members and adapted to continuously engage in rolling contact with associated rail members.

7. An apparatus as described in claim 5 and, in addition, vibratory motion generation means arranged proximate to where the web conveyor means disengages the belt means to impart vibration motion to the web conveyor and belt means to assist in the dislodgement of the cooked article from the associated mold member.

8. An apparatus as described in claim 6 wherein said guide means is arranged to that the continuous web conveyor means re-enters said fluid cooking medium containment means subsequent to discharge of the cooked articles and travels through said fluid containment means to a position outside said containment means to receive a finite quality of amorphous dough-like material thereon and be positioned into operative engagement with mold members arranged on said continuous belt means for shaping and cooking of articles of desired configuration.

9. An apparatus as described in claim 1 and, in addition, means for removing said cooked article from said conveyor means at a point which is remote from the point where said web means disengages said conveyor means.

10. An apparatus as set forth in claim 5 wherein said guide means include a downwardly convergent, upwardly divergent portion beginning in the vicinity where said operatively engaged article-containing portions of said conveyor and belt means begin their separation as they emerge from said fluid cooking medium containment means.

11. An apparatus as set forth in claim 10 wherein said downwardly convergent, upwardly divergent portion comprises first and second rail portions joined to form track means having an included angle of from about ninety degrees to about one hundred and sixty degrees.

12. An apparatus as set forth in claim 10 wherein said downwardly convergent, upwardly divergent portion comprises first and second rail portions joined to form track means having an included angle of from about one hundred thirty-five degrees to about one hundred and fifty-five degrees.

13. Apparatus for forming and cooking articles made from material of dough-like consistency, comprising:
(a) means adapted to contain a fluid cooking medium at at an elevated temperature;
(b) an endless belt means adapted for continuous operation;
(c) a plurality of convex porous mold members arranged on a surface of said belt means;
(d) a web-like articulated continuous conveyor means adapted to receive finite quantities of amorphous dough-like material; said web-like conveyor means comprising an endless belt of chain mesh, a continuous chain member attached to and contiguous with each of the two lateral edges of said chain mesh belt, and a plurality of bar members arranged transversely across said chain mesh belt to form a plurality of junctions between parallel portions of said two chain members through said bar members;
(e) means for intermittently positioning consecutive portions of said web-like conveyor means into operative engagement with consecutive mold members arranged on said continuous belt means to shape each of said quantities of material of amorphous, dough-like consistency into articles of desired configuration, said engaged portions of said conveyor and belt means thereafter moving into said fluid cooking medium containment means;
(f) guide means arranged interiorly and exteriorly of said fluid cooking medium containment means and adapted to direct the transportation of said operatively engaged article-containing portion of said conveyor and belt means through said fluid cooking medium containment means in a submerged position and to thereafter facilitate their separation as they emerge from said cooking medium containment means, said articles being removed on said conveyor means in an attitudinal orientation promoting optimal drainage and return of entrained fluid cooking medium to the cooking medium containment means, said guide means comprising continuous parallel rail members arranged on opposite lateral sides of said apparatus, a portion of each rail member being arranged within the fluid cooking medium containment means, and the remainder of each rail member being arranged exteriorly of said containment means, and wherein said guide means include a downwardly convergent, upwardly divergent portion beginning in the vicinity where said operatively engaged article-containing portions of said conveyor and belt means begin their separation as they emerge from said fluid cooking medium containment means.

14. An apparatus as set forth in claim 13 wherein said downwardly convergent, upwardly divergent portion comprises first and second rail portions joined to form track means having an included angle of from about ninety degrees to about one hundred and sixty degrees.

15. An apparatus as set forth in claim 13 wherein said downwardly convergent, upwardly divergent portion comprises first and second rail portions joined to form track means having an included angle of from about one hundred thirty-five degrees to about one hundred and fifty-five degrees.

* * * * *